(12) United States Patent
Adema et al.

(10) Patent No.: US 10,481,408 B2
(45) Date of Patent: Nov. 19, 2019

(54) APPARATUS FOR REDUCING COHERENCE OF A LASER BEAM

(71) Applicant: CHRISTIE DIGITAL SYSTEMS USA, INC., Cypress, CA (US)

(72) Inventors: Daniel Robert Adema, Kitchener (CA); Joseph Ma, Waterloo (CA)

(73) Assignee: CHRISTIE DIGITAL SYSTEMS (USA), INC., Cypress ( * ) Notice: Subject to any disclaimer, the term of this patent is extended or adjusted under 35 U.S.C. 154(b) by 359 days.

(21) Appl. No.: 15/281,965

(22) Filed: Sep. 30, 2016

(65) Prior Publication Data

US 2018/0095291 A1 Apr. 5, 2018

(51) Int. Cl.
| | |
|---|---|
| G02B 17/00 | (2006.01) |
| G02B 27/48 | (2006.01) |
| G02B 27/14 | (2006.01) |
| G02B 27/64 | (2006.01) |

(52) U.S. Cl.
CPC ............ G02B 27/48 (2013.01); G02B 17/00 (2013.01); G02B 17/004 (2013.01); G02B 17/008 (2013.01); G02B 27/144 (2013.01); G02B 27/642 (2013.01)

(58) Field of Classification Search
None
See application file for complete search history.

(56) References Cited

U.S. PATENT DOCUMENTS

| | | | | |
|---|---|---|---|---|
| 3,633,999 | A | 1/1972 | Buckles | |
| 4,264,135 | A * | 4/1981 | Lang | H01S 3/0057 359/264 |
| 4,871,232 | A * | 10/1989 | Grinberg | G01R 23/17 359/618 |

(Continued)

FOREIGN PATENT DOCUMENTS

| | | | |
|---|---|---|---|
| JP | 2008112623 A | * | 5/2008 |
| JP | 2011098759 A | | 11/2009 |

(Continued)

OTHER PUBLICATIONS

EPO, Extended European Search Report, dated Apr. 30, 2018, re European Patent Application No. 17174414.7.

(Continued)

*Primary Examiner* — Robert E. Tallman
*Assistant Examiner* — Gary W O'Neill
(74) *Attorney, Agent, or Firm* — Perry + Currier Inc.

(57) ABSTRACT

There is provided an an apparatus for reducing coherence of a laser beam, which apparatus comprises a rectangular chamber having a first, second, and third walls each comprising a reflective inner surface, and a fourth wall comprising a beam splitter. The fourth wall is configured to transmit a portion of the laser beam into the chamber to form an input beam incident upon the first wall. The first wall is configured to reflect the input beam onto the second wall, which is configured to reflect the input beam onto the third wall, which is configured to reflect the input beam onto the fourth wall. The fourth wall is configured to reflect a portion of the (Continued)

input beam to form a further input beam incident upon the first wall and to transmit another portion of the input beam out of the chamber to form an output laser beam.

13 Claims, 16 Drawing Sheets

(56) References Cited

U.S. PATENT DOCUMENTS

| | | | |
|---|---|---|---|
| 5,233,460 A | | 8/1993 | Partlo et al. |
| 5,296,972 A | | 3/1994 | McKinley |
| 5,815,523 A | * | 9/1998 | Morris .................. H01S 3/0606 |
| | | | 372/66 |
| 6,238,063 B1 | * | 5/2001 | Tanitsu ............... G03F 7/70208 |
| | | | 359/629 |
| 2008/0297731 A1 | | 12/2008 | Powell et al. |
| 2011/0205504 A1 | | 8/2011 | Masood |
| 2014/0009829 A1 | * | 1/2014 | Jennings ............ B23K 26/0604 |
| | | | 359/489.08 |

FOREIGN PATENT DOCUMENTS

| | | |
|---|---|---|
| JP | 2010122284 A | 6/2010 |
| JP | 2010224311 A | 10/2010 |
| WO | 0157581 A2 | 8/2001 |

OTHER PUBLICATIONS

Partial European Search Report, dated Jan. 3, 2018, by EPO, re European Patent Application No. 17174414.7.

* cited by examiner

APPARATUS FOR REDUCING COHERENCE OF A LASER BEAM

FIELD

The present specification relates to an apparatus for reducing the coherence of a laser beam, and in particular to an apparatus for reducing the coherence of a laser beam using stationary optical components.

BACKGROUND

Lasers are often used for image projection because they can provide narrow emission bandwidths and high brightness. However, laser light also tends to have a high degree of coherence which can cause speckle in images projected using the laser light. Such speckle can appear as artifacts visible to viewers, thereby degrading the quality of the projected image.

To mitigate speckle, some projector designs use moving components in the optical path of the laser beam to reduce the coherence of the beam and therefore reduce speckle. However, such moving components tend to be prone to mechanical wear and failure. In addition, many of these components tend to increase the etendue of the laser beam that can be used to project the image.

SUMMARY

A rectangular chamber having three walls with reflective inner surfaces and a fourth wall comprising a beam splitter can be used to generate additional modes, and thereby reduce the coherence, of a laser beam. The walls and the beam splitter of this chamber are stationary in relation to the laser beam, and as such are not subject to the mechanical ware and failure that generally affects moving optical components. In addition, such a chamber does not increase the etendue of the laser beam.

In operation, the beam splitter of the fourth wall transmits a portion of the laser beam into the chamber to form an input laser beam. This input laser beam is reflected by the three reflective walls back onto the beam splitter, which transmits a portion of the input laser beam out of the chamber to form a portion of an output laser beam. The beam splitter also reflects another portion of the input laser beam back towards the reflective walls to form an additional input laser beam. As such, the beam continues to cycle between the three reflective walls and the beam splitter, and every time the beam is incident upon the beam splitter a portion of the beam is transmitted out of the chamber to form a portion of the output laser beam.

This chamber defines a light path extending from the beam splitter, to the first wall, to the second wall, to the third wall, and back onto the beam splitter. This light path can be a closed loop. When the length of the light path is greater than or equal to the coherence length of the laser beam, the chamber can generate additional modes and thereby reduce the coherence of the laser beam. Multiple chambers can be optically coupled together to increase the number of additional modes that can be generated.

If two or more of the four optical components (i.e. the three reflective walls and the beam splitter) are tilted in relation to one another about at least two axes, the apparatus can also rotate the laser beam about its axis of propagation. When the optical components are titled in this manner, every time the beam passes through the light path loop, the output laser beam generated by that pass becomes rotated by a given rotational displacement about its axis of propagation relative to the output laser beam generated by the previous pass of the input laser beam. For a continuous laser beam, the output laser beam can be the combination of the various output laser beams with different rotational orientations. As such, this apparatus can increase the rotational homogeneity of the laser beam.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

An aspect of the present specification provides an apparatus for reducing a coherence of a laser beam, the apparatus comprising: a chamber being rectangular, the chamber comprising: a first wall, a second wall, and a third wall each comprising a reflective inner surface; and a fourth wall comprising a beam splitter. The fourth wall is configured to transmit at least a portion of the laser beam into the chamber to form an input laser beam incident upon the first wall. The first wall is configured to reflect the input laser beam onto the second wall. The second wall is configured to reflect the input laser beam onto the third wall; and the third wall is configured to reflect the input laser beam onto the fourth wall. Moreover, the fourth wall is further configured to reflect a first portion of the input laser beam to form a further input laser beam incident upon the first wall and to transmit a second portion of the input laser beam out of the chamber to form an output laser beam. The chamber defines a light path extending from the fourth wall, to the first wall, to the second wall, to the third wall, and back onto the fourth wall. The light path is a closed loop, and the light path has a length greater than or equal to a coherence length of the laser beam.

The chamber can be square.

The fourth wall can comprise a 50/50 beam splitter.

The further input laser beam can be about coincident with the input laser beam.

The apparatus can further comprise one or more focusing lenses disposed in the light path.

The apparatus can further comprise: a further chamber being rectangular, the further chamber comprising: a further first wall, a further second wall, and a further third wall each comprising a corresponding reflective inner surface; and a further fourth wall comprising a corresponding beam splitter. The further chamber also comprises a middle wall comprising a corresponding reflective surface, the middle wall disposed between the chamber and the further chamber. The fourth wall and the further fourth wall face one another. The middle wall is parallel with the first wall and the further third wall, and the middle wall is configured to reflect the output laser beam onto an outer surface of the further fourth wall. The further chamber is configured to receive as an input the output laser beam and produce as an output a further output laser beam.

The middle wall can lie on a common plane with the first wall and the further third wall.

The further chamber can be square.

The length of the light path defined by the chamber can be different than a further length of a further light path defined by the further chamber.

The apparatus can further comprise: an additional apparatus comprising an additional chamber, an additional further chamber, and an additional middle wall. The additional apparatus can be oriented such that: the additional middle wall is disposed about parallel to the middle wall, the corresponding reflective surface of the middle wall facing a corresponding reflective surface of the additional middle wall; and the further chamber can be oriented to direct the further output laser beam output from the further chamber to be incident upon an additional fourth wall of the additional chamber as a corresponding input into the additional apparatus. The additional apparatus can be configured to receive as a corresponding input the further output laser beam and produce as a corresponding output an additional output laser beam.

According to another aspect of the present specification there is provided an apparatus for reducing a coherence of a laser beam, the apparatus comprising: a first reflector, a second reflector, a third reflector, and a beam splitter together defining a light path being a closed loop. The beam splitter is configured to: transmit a first portion of the laser beam to form an input laser beam directed along the light path towards the first reflector; and reflect a second portion of the laser beam to form a reflected laser beam directed in an output direction. The first reflector is configured to reflect the input laser beam along the light path towards the second reflector; the second reflector is configured to reflect the input laser beam reflected from the first reflector along the light path towards the third reflector; and the third reflector is configured to reflect the input laser beam reflected from the second reflector along the light path and in the output direction towards the beam splitter. One or more of the first reflector and the third reflector is tilted about at least two axes relative to the beam splitter. The beam splitter is further configured to: transmit a third portion of the input laser beam reflected from the third reflector to form an output laser beam directed in the output direction; and reflect a fourth portion of the input laser beam reflected from the third reflector along the light path towards the first reflector. The output laser beam has a rotational orientation about its axis of propagation that is displaced by a rotational displacement relative to a corresponding rotational orientation of the laser beam about its corresponding axis of propagation.

Dividing 360° by the rotational displacement can produce a non-zero remainder.

The beam splitter can comprise a 50/50 beam splitter.

The light path can have a length being greater than or equal to a coherence length of the laser beam.

The apparatus can comprise apparatuses from each aspect of the present specification optically coupled with one another such that the output laser beam of the apparatus of one aspect of the specification is usable as the corresponding laser beam of the apparatus of the other aspect of the specification.

BRIEF DESCRIPTION OF THE DRAWINGS

Some implementations of the present specification will now be described, by way of example only, with reference to the attached Figures, wherein.

DETAILED DESCRIPTION

Figure 1:
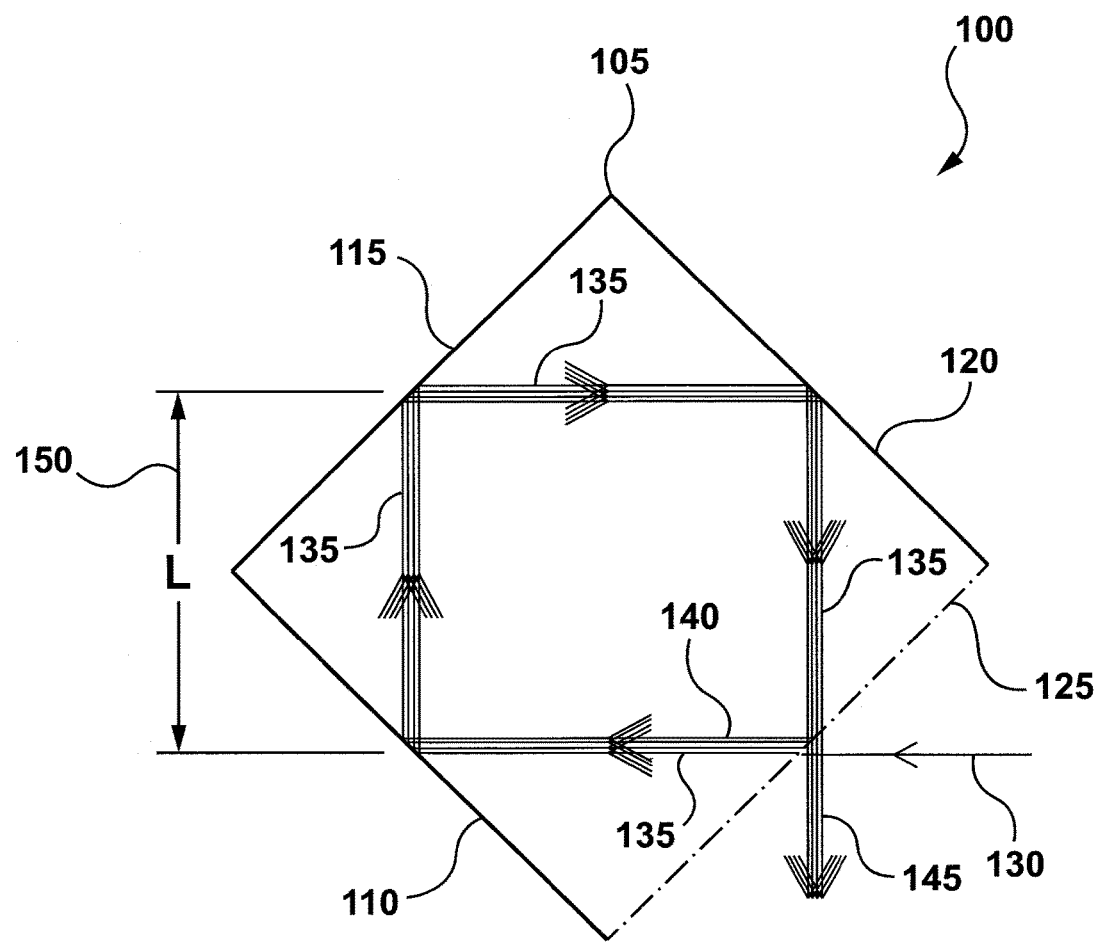
FIG. 1 shows an apparatus for reducing coherence of a laser beam, according to non-limiting implementations.

To address the challenges in reducing the coherence of, and the speckle produced by, a laser beam while avoiding increasing the etendue and the use of moving parts, this specification provides an apparatus 100 for reducing the coherence of a laser beam 130, as shown schematically in FIG. 1. Apparatus 100 comprises a chamber 105, which in turn comprises a first wall 110, a second wall 115, a third wall 120, and a fourth wall 125. Walls 110, 115, and 120 each comprise a reflective inner surface. Wall 125 comprises a beam splitter.

Laser beam 130 is partly transmitted through the beam splitter of wall 125 into chamber 105. This transmitted portion forms an input laser beam 135 that is incident upon wall 110. Another portion of laser beam 130 is reflected from wall 125 to form a portion of an output laser beam 145. Wall 110 in turn reflects input laser beam 135 onto wall 115, which then reflects input laser beam 135 onto wall 120. Wall 120, in turn, reflects input laser beam 135 back onto the beam splitter of wall 125.

Wall 125 reflects a portion of input laser beam 135 to form a further input laser beam 140 incident upon wall 110. In addition, wall 125 transmits another portion of input laser beam 135 to form a portion of output laser beam 145. Further input laser beam 140 is then reflected by walls 110, 115, and 120 and onto the beam splitter of wall 125 in a manner similar to input laser beam 135. At wall 125, a portion of further input laser beam is transmitted to form a part of output laser beam 145, while another portion of further input laser beam 140 is reflected by wall 125 to form a yet further input laser beam. In this manner, input laser beam 135 cycles around the four walls of chamber 105, and every time the beam is incident upon the beam splitter of wall 125, a portion of the beam is transmitted out of chamber 105 and another portion of the beam is reflected to cycle through the three reflective walls of chamber 105 again.

As such, chamber 105 defines a light path that extends from wall 125, to wall 110, to wall 115, to wall 120, and back onto wall 125. In some implementations, this light path can be a closed loop. In other words, input laser beam 135 is reflected onto the same point or substantially the same point on wall 125 through which a portion of laser beam 130 was transmitted into chamber 105. Moreover, in some implementations, further input laser beam 140, and/or the subsequent input laser beams, can be coincident or substantially coincident with input laser beam 135. FIG. 1 shows laser beams 135 and 140 as being separate, parallel beams, for ease of illustration only. It is contemplated that beams 135 and 140 can coincide, in which case beams 135 and 140 would appear as one single beam. Moreover, in such a case, beams 135 and 145 would also each appear as a single beam similar to the way laser beam 130 is depicted in FIG. 1.

The light path defined by chamber 105 has a length that is four times the length 150 (marked "L" in FIG. 1). In other words, the length of the light path is 4L. In order to create additional modes of, and thereby reduce the coherence of, laser beam 130, the length of the light path (4L) is set to be greater than or equal to the coherence length of laser beam 130. The coherence length can be calculated as the square of the average wavelength of laser beam 130 divided by the difference between the longest and shortest wavelengths comprising laser beam 130. Every time input laser beam 135 cycles through one loop of the light path, a new mode is generated. The larger the number of modes, the lower the coherence of output laser beam 145, and the less the speckle that will be generated when output laser beam 145 is used to project an image.

The skilled person would understand that most light reflectors and transmitters are not perfect, in the sense that there can be losses when a beam of light reflects from the reflector or a beam splitter, or when the light is transmitted through a component such as a beam splitter. In chamber 105, if walls 110, 115, and 120 have reflectivity "r" and beam splitter of wall 125 has absorption loss a, then the ratio of the intensity output laser beam 145 to the intensity of laser beam 130 can be calculated as $[0.5+(0.5)(1-\alpha)^2 r^3/(1-(0.5) r^3)]$. According to this equation, in an implementation where $\alpha=0.005$ and $r=0.995$, the ratio of the intensity of output laser beam 145 to the intensity of laser beam 130 amounts to 0.98, which represents a 2% intensity loss as a result of using apparatus 100 to reduce the coherence of laser beam 130, and thereby reduce the speckle associated with using output laser beam 145 to project an image.

As such, apparatus 100 can reduce the coherence of, and the speckle associated with, laser beam 130 using components that are stationary relative to the laser beam and without increasing the etendue of the laser beam. In addition, the intensity losses associated with using apparatus 100 can be modest as discussed above.

While chamber 105 is shown as being square, it is contemplated that the chamber can be rectangular, or have any other suitable shape. In addition, chamber 105 is shown as being closed in the sense that walls 110, 115, 120, and 125 meet one another at the corners of chamber 105. However, it is also contemplated that two or more of the walls may be partially or fully disconnected from one another. In addition, it is contemplated that in some implementations only a portion of the inner surface of one or more of walls 110, 115, and 120 can be reflective, this portion being that which is exposed to input laser beam 135.

As discussed above, wall 125 comprises a beam splitter. In some implementations, only the portion of wall 125 exposed to laser beams comprises a beam splitter; while in other implementations, portions of wall 125 not exposed to laser beams can also comprise a beam splitter. The beam splitter can comprise a 50/50 beam splitter, or a beam splitter having any other ratio of reflectivity to transmission.

In some implementations, not shown, apparatus 100 can further comprise one or more focusing lenses in the light path. If the input laser beam is not perfectly collimated (i.e. is slightly divergent), it can become increasingly divergent as it cycles through multiple passes of the light path. The focusing lenses can refocus the input light beam in each pass of the light path, and thereby prevent the divergence of the input laser beam from increasing after each pass through the light path.

Figure 2:
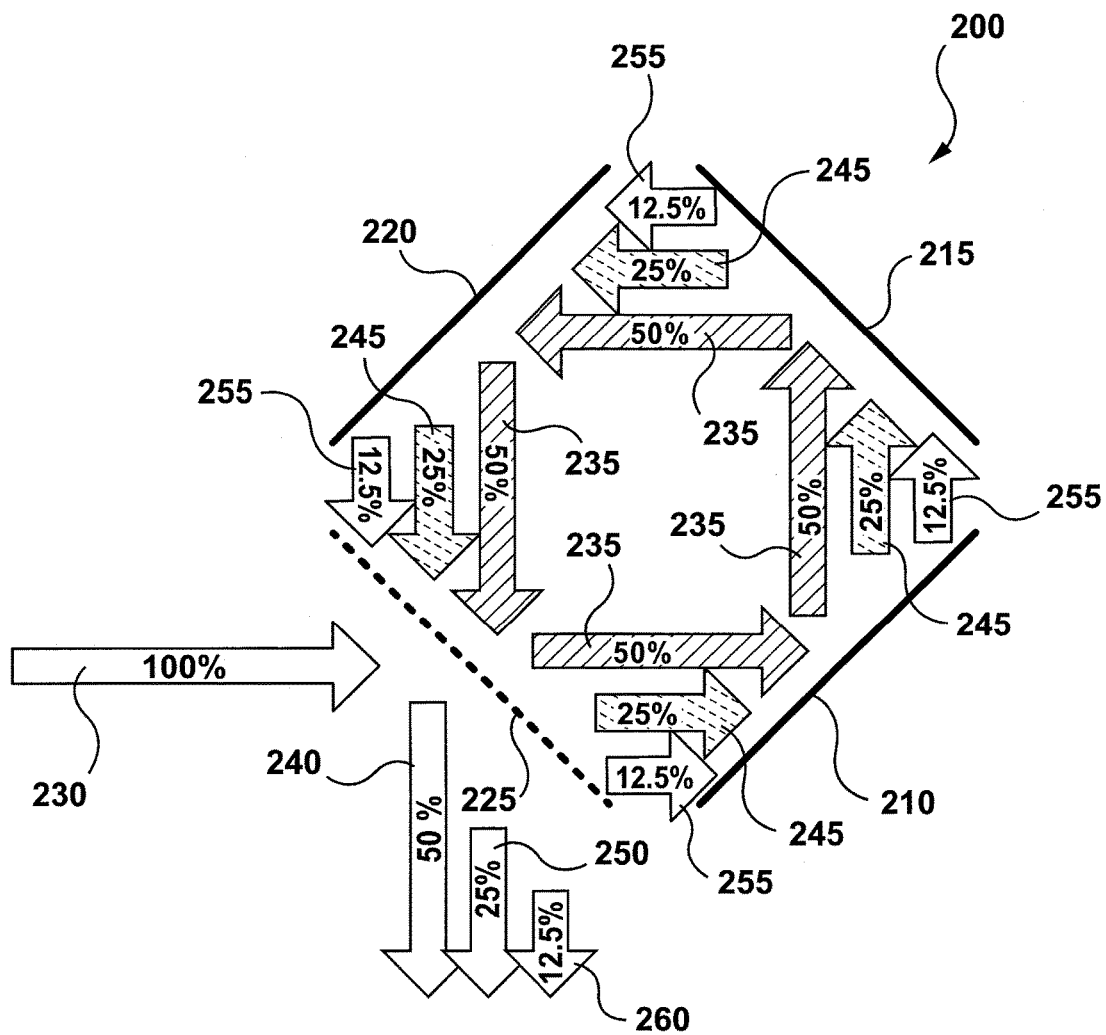
FIG. 2 shows another apparatus for reducing coherence of a laser beam, according to non-limiting implementations.

FIG. 2 shows another apparatus 200 for reducing coherence of a laser beam. Apparatus 200 is similar to apparatus 100 in that apparatus 200 comprises a first reflector 210, a second reflector 215, and third reflector 220, and a beam splitter 225 arranged in an orientation similar to walls 110, 115, 120, and 125 respectively. The difference between apparatus 200 and apparatus 100 is that unlike the walls in apparatus 100, the reflectors 210, 215, and 220 and beam splitter 225 of apparatus 200 are not joined together at the corners. Despite this difference in physical structure, apparatus 200 optically functions in a manner similar to apparatus 100.

Laser beam 230 is incident upon beam splitter 225, which transmits a portion of laser beam 230 to form first input laser beam 235, and reflects another portion of laser beam 230 to form a first output laser beam 240. By way of non-limiting example and for illustrative purposes only, beam splitter 225 is set to be an ideal 50/50 beam splitter. As such, first input laser beam 235 represents 50% of the intensity of laser beam 230 and first output laser beam 240 also represents 50% of the intensity of laser beam 230.

First input laser beam 235 is reflected by reflectors 210, 215, and 220 back onto beam splitter 225, which again reflects a portion of first input laser beam 235 to form a second input laser beam 245 and transmits another portion of first input laser beam 235 to form a second output laser beam 250. Second input laser beam 245 represents 25% of the intensity of laser beam 230 and second output laser beam 250 also represents 25% of the intensity of laser beam 230.

Second input laser beam 245 is then reflected by reflectors 210, 215, and 220 back onto beam splitter 225, which again reflects a portion of second input laser beam 245 to form a third input laser beam 255, and transmits another portion of second input laser beam 245 to form a third output laser beam 260. Third input laser beam 255 represents 12.5% of the intensity of laser beam 230 and third output laser beam 260 also represents 12.5% of the intensity of laser beam 230.

While for clarity and ease of illustration FIG. 2 depicts only three passes of the input laser beam through the light path defined by reflectors 210, 215, and 220 and beam splitter 225, the skilled person would understand that the input laser beam continues to cycle through the light path with each cycle producing a corresponding output laser beam having an intensity lower than the intensity of the output laser beam produced by the previous cycle. For a continuous laser beam 230, the beam output from apparatus 200 is the combination of first output laser beam 240, second output laser beam 250, third output laser beam 260, and all the subsequent output laser beams.

Moreover, for clarity of illustration, in FIG. 2 input laser beams 235, 245, and 255 are shown as being offset from (i.e. not coincident with) one another. However, in practice input laser beams 235, 245, 255 and the subsequent input laser beams (associated with continuing cycles of the beam between the reflectors and the beam splitter) are coincident or substantially coincident.

In addition, for clarity of explanation, in FIG. 2 the reflectors are shown as losslessly reflecting light and the beam splitter is shown as losslessly reflecting and transmitting light. However, the skilled person would understand that actual reflectors and beam splitters are not lossless, and any losses associated with their reflectivity or transmission would further diminish the intensity of each subsequent output laser beam. Such losses were discussed above in relation to apparatus 100.

Figure 3:
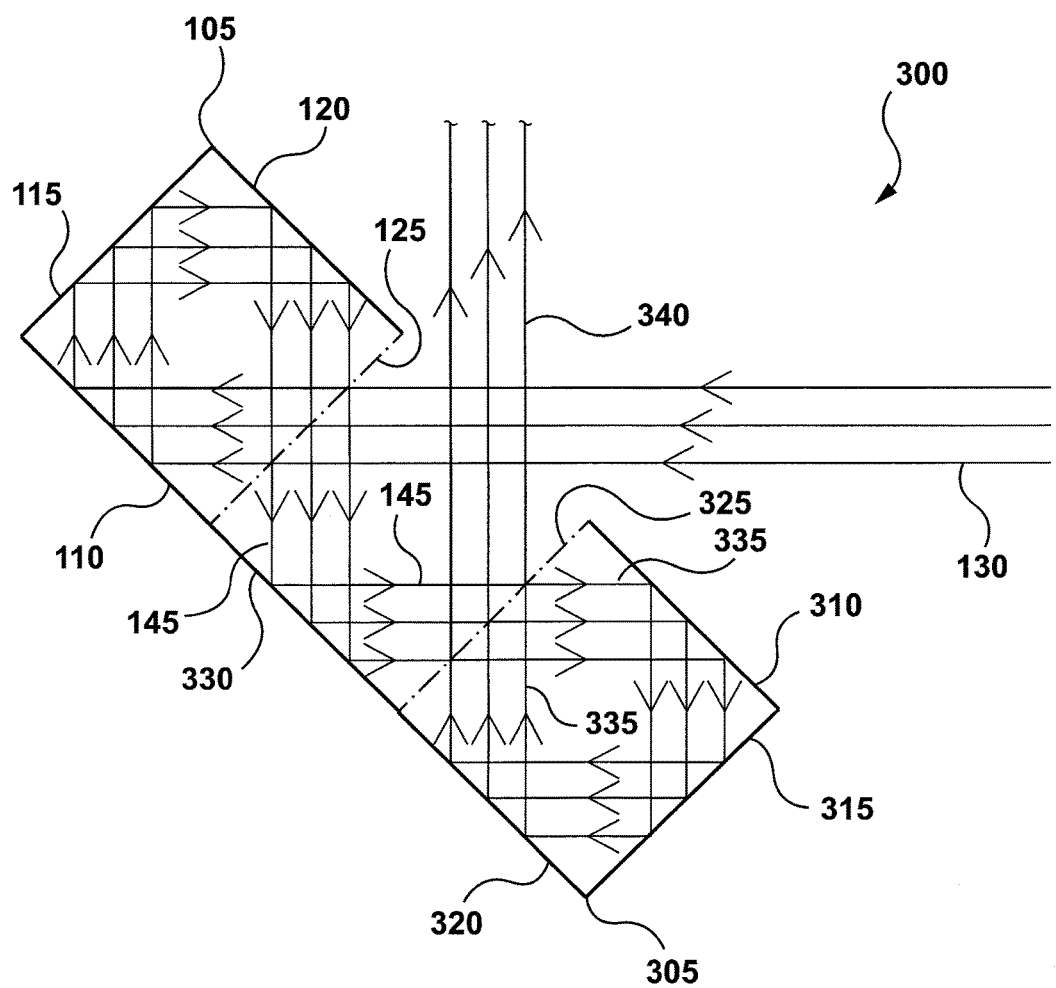
FIG. 3 shows yet another apparatus for reducing coherence of a laser beam, according to non-limiting implementations.

Turning now to FIG. 3, an apparatus 300 for reducing the coherence of a laser beam is shown. Apparatus 300 comprises apparatus 100 and a second chamber 305 that is similar to chamber 105 of apparatus 100. Chamber 305 comprises a first wall 310, a second wall 315, a third wall 320, and a fourth wall 325. Walls 310, 315, and 320 comprise a reflective inner surface, and wall 325 comprises a beam splitter.

Apparatus 300 further comprises a middle wall 330 disposed between chamber 105 and chamber 305. In apparatus 300, middle wall 330 lies on a common plane with wall 110 and wall 320. However, it is contemplated that middle wall 330 can be parallel to wall 110 and of chamber 105 and wall 320 of chamber 305 without lying on a common plane with wall 110 and wall 320. Moreover, in apparatus 300 wall 125 of chamber 105 faces wall 325 of chamber 305. Wall 125 can be parallel to or substantially parallel to wall 325. In this orientation, chamber 305 can receive as an input output laser beam 145, and chamber 305 can in turn produce output laser beam 340.

In addition, middle wall 330 comprises a reflective surface configured to reflect output laser beam 145 of apparatus 100 onto the outer surface of wall 325 of chamber 305. The beam splitter of wall 325 reflects a portion of output laser beam 145 to form a part of output laser beam 340. Wall 325 also transmits another portion of output laser beam 145 to form input laser beam 335 incident upon wall 310. Walls 310, 315, and 320 reflect input laser beam 335 back onto the beam splitter of wall 325, which transmits a portion of input laser beam 335 to form a part of output laser beam 340 and reflects another portion of input laser beam 335 back onto wall 310.

Similar to chamber 105, chamber 305 can be generally rectangular. Chamber 305 can also be square, or can have any other suitable shape. Moreover, similar to chamber 105, chamber 305 can define a light path extending from wall 325 to wall 310, to wall 315, to wall 320, and back onto wall 325. Light path of chamber 305 can have a length the same as or different from the light path of chamber 105. In some implementations, not shown, chamber 305 can have a different side length (i.e. different dimensions) than chamber 105, which difference will cause the light path of chamber 305 to have a different length than the light path of chamber 105.

Figure 4:
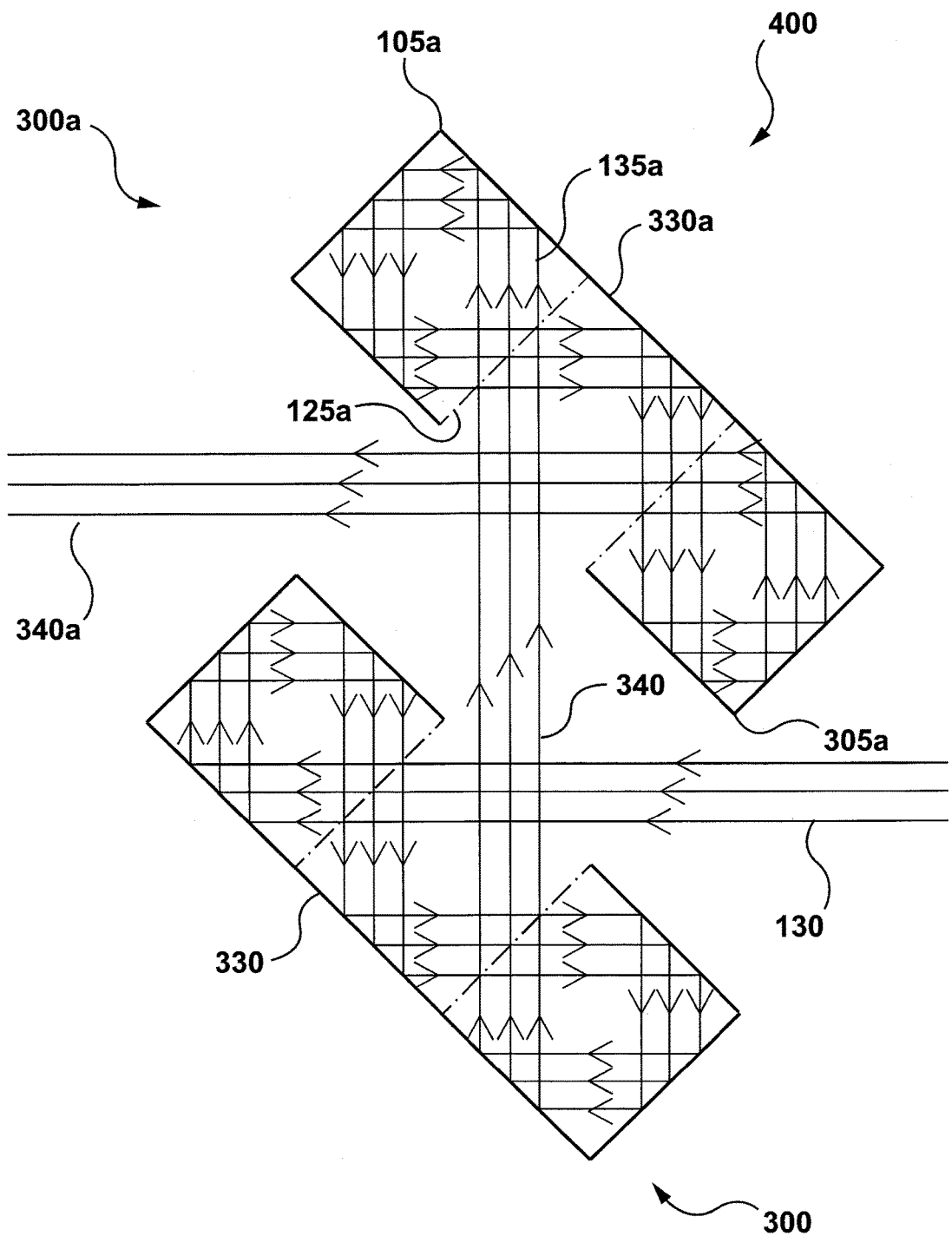
FIG. 4 shows yet another apparatus for reducing coherence of a laser beam, according to non-limiting implementations.

Turning now to FIG. 4, an apparatus 400 for reducing the coherence of a laser beam is shown. Apparatus 400 comprises apparatus 300 and another apparatus 300a that is similar to apparatus 300. Apparatus 300a functions optically in a manner similar to apparatus 300. Apparatus 300a comprises a chamber 105a which is similar to chamber 105, a chamber 305a which is similar to chamber 305, and a middle wall 330a which is similar to middle wall 330. Chamber 105a comprises a wall 125a which comprises a beam splitter.

Apparatus 300a is oriented in relation to apparatus 300 such that middle wall 330 is parallel or substantially parallel to middle wall 330a, and reflective surface of middle wall 330 faces the reflective surface of middle wall 330a. In addition, apparatus 300a is oriented such that output laser beam 340 is incident upon wall 125a of chamber 105a, which wall 125a transmits a portion of output laser beam 340 into chamber 105a to form a corresponding input laser beam 135a. In this orientation, apparatus 300a receives output laser beam 340 of apparatus 300 as an input and produces an output laser beam 340a.

Figure 5:
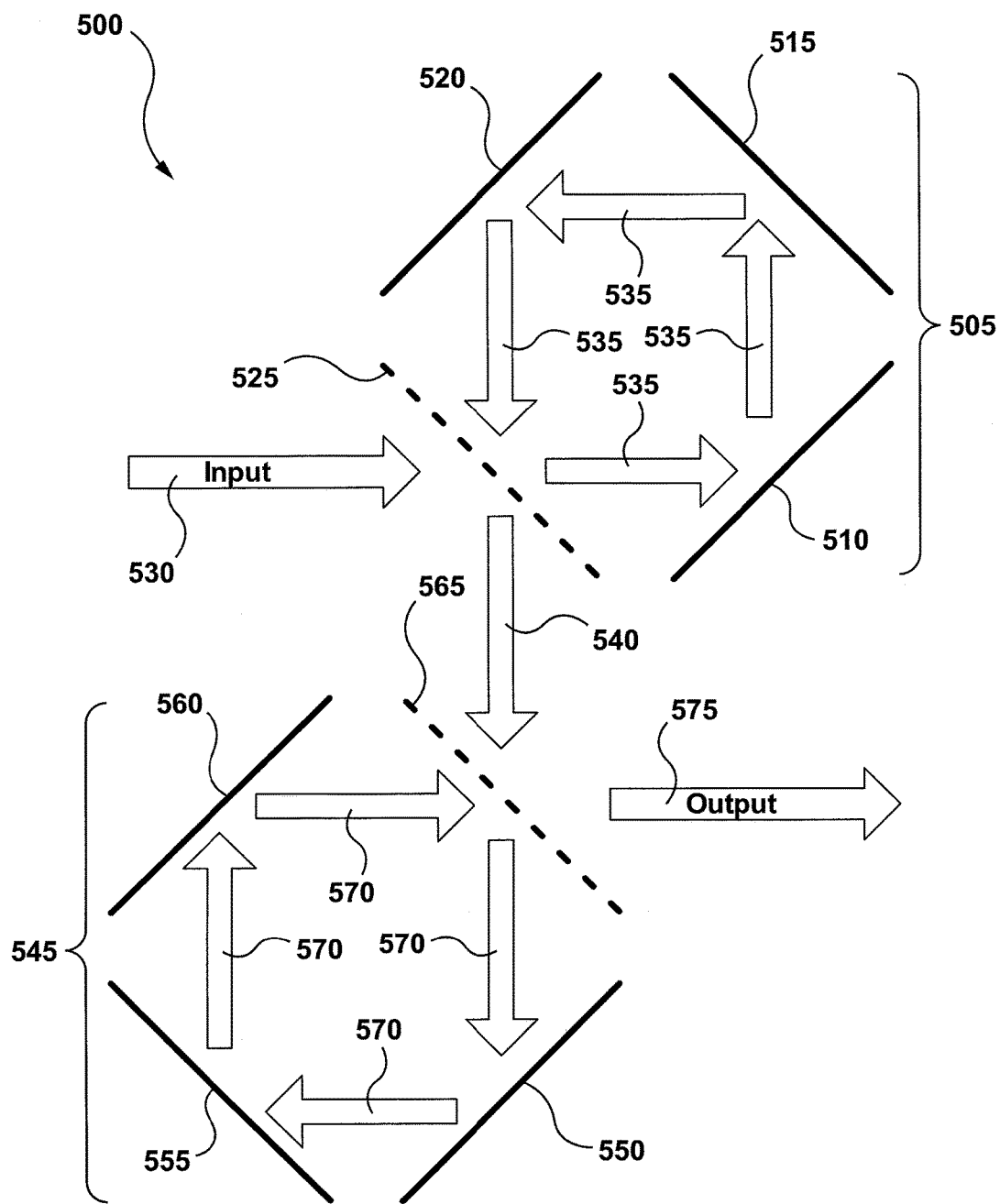
FIG. 5 shows yet another apparatus for reducing coherence of a laser beam, according to non-limiting implementations.

Turing now to FIG. 5, an apparatus 500 is shown for reducing coherence of a laser beam. Apparatus 500 comprises a chamber 505 which is similar in structure to apparatus 200 and is similar in optical function to both chamber 105 and to apparatus 200. Chamber 505 comprises a first reflector 510, a second reflector 515, a third reflector 520, and a beam splitter 525. Apparatus 500 also comprises a second chamber 545 which is generally similar to chamber 505, and comprises a first reflector 550, a second reflector 555, a third reflector 560, and a beam splitter 565.

Chambers 505 and 545 can be generally square or rectangular, and can have dimensions that are the same as or different from one another. Beam splitter 525 of chamber 505 can be parallel to or substantially parallel to beam splitter 565 of chamber 545. This orientation can allow an output laser beam 540 of chamber 505 to be incident upon beam splitter 565 and to form a portion of an input laser beam 570 of chamber 545.

In apparatus 500, laser beam 530 is incident upon beam splitter 525, which reflects a portion of laser beam 530 to form a part of output laser beam 540 and transmits another portion of laser beam 530 to form input laser beam 535. Input laser beam 535, in turn, is reflected by reflectors 510, 515, and 520 back onto beam splitter 525. Beam splitter 525, then, transmits a portion of input laser beam 535 to form a part of output laser beam 540 and reflects another portion of input laser beam 535 back onto reflector 510.

Output laser beam 540 is incident upon beam splitter 565, which reflects a portion of output laser beam 540 to form a part of an output laser beam 575 and transmits another portion of output laser beam 540 to form input laser beam 570. Input laser beam 570, then, is reflected by reflectors 550, 555, and 560 back onto beam splitter 565. Beam splitter 565, in turn, transmits a portion of input laser beam 570 to form a part of output laser beam 575 and reflects another portion of input laser beam 570 back onto reflector 550. For a continuous laser beam 530, output laser beam 575 can comprise the combination of the beams transmitted out of chamber 545 during each pass of the beam through the loop of the light path defined by reflectors 550, 555, and 560 and beam splitter 565.

Figure 6:
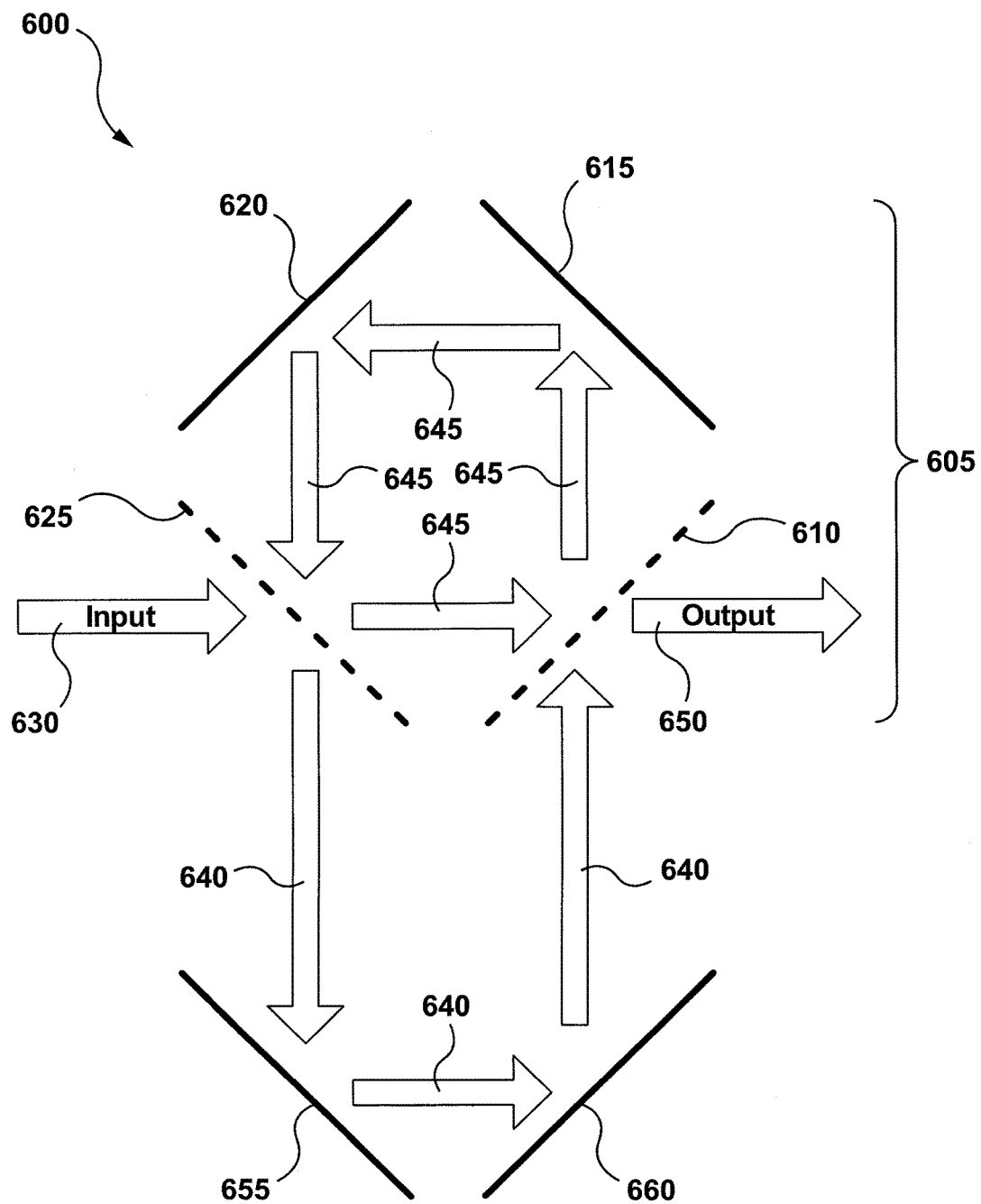
FIG. 6 shows yet another apparatus for reducing coherence of a laser beam, according to non-limiting implementations.

Turning now to FIG. 6, an apparatus 600 for reducing coherence of a laser beam is shown. Apparatus 600 comprises a chamber 605 comprising a first beam splitter 610, a first reflector 615, a second reflector 620, and a second beam splitter 625. Chamber 605 can have a geometry similar to chamber 105 or to apparatus 200. In addition, apparatus comprises a first additional reflector 655 and a second addition reflector 660, which can be parallel to or substantially parallel to beam splitter 625 and beam splitter 610 respectively.

In operation, laser beam 630 can be incident upon beam splitter 625 which reflects a portion of laser beam 630 to form reflected laser beam 640 and transmits another portion of laser beam 630 to form input laser beam 635. Input laser beam 635, in turn, is incident upon beam splitter 610 which transmits a portion of input laser beam 635 to form a part of output laser beam 650 and reflects another portion of input laser beam 635 to form reflected laser beam 645. Reflected laser beam 645 is then reflected by reflectors 615 and 620 back onto beam splitter 625 which reflects a portion of reflected laser beam 645 along the same or substantially the same direction as input laser beam 635. Beam splitter 625 also transmits another portion of reflected laser beam 645 to form a part of reflected laser beam 640.

Reflectors 655 and 660 are oriented such that reflected laser beam 640 is reflected by reflectors 655 and 660 back onto beam splitter 610 at the same or substantially the same position as input laser beam 635 was incident upon beam splitter 610. In turn, beam splitter 610 reflects a portion of reflected laser beam 640 to form a part of output laser beam 650 and transmits another portion of reflected laser beam 640 to form another laser beam that is coincident with or substantially coincident with reflected laser beam 645.

By adjusting the dimensions of chamber 605 and the distance between reflectors 655 and 660 to chamber 605, the various path lengths of light through apparatus 600 can be adjusted. This can in turn determine the number of modes of output laser beam 650 generated by apparatus 600. The number of such modes can determine the extent to which apparatus 600 can reduce the coherence of laser beam 630.

Figure 7:
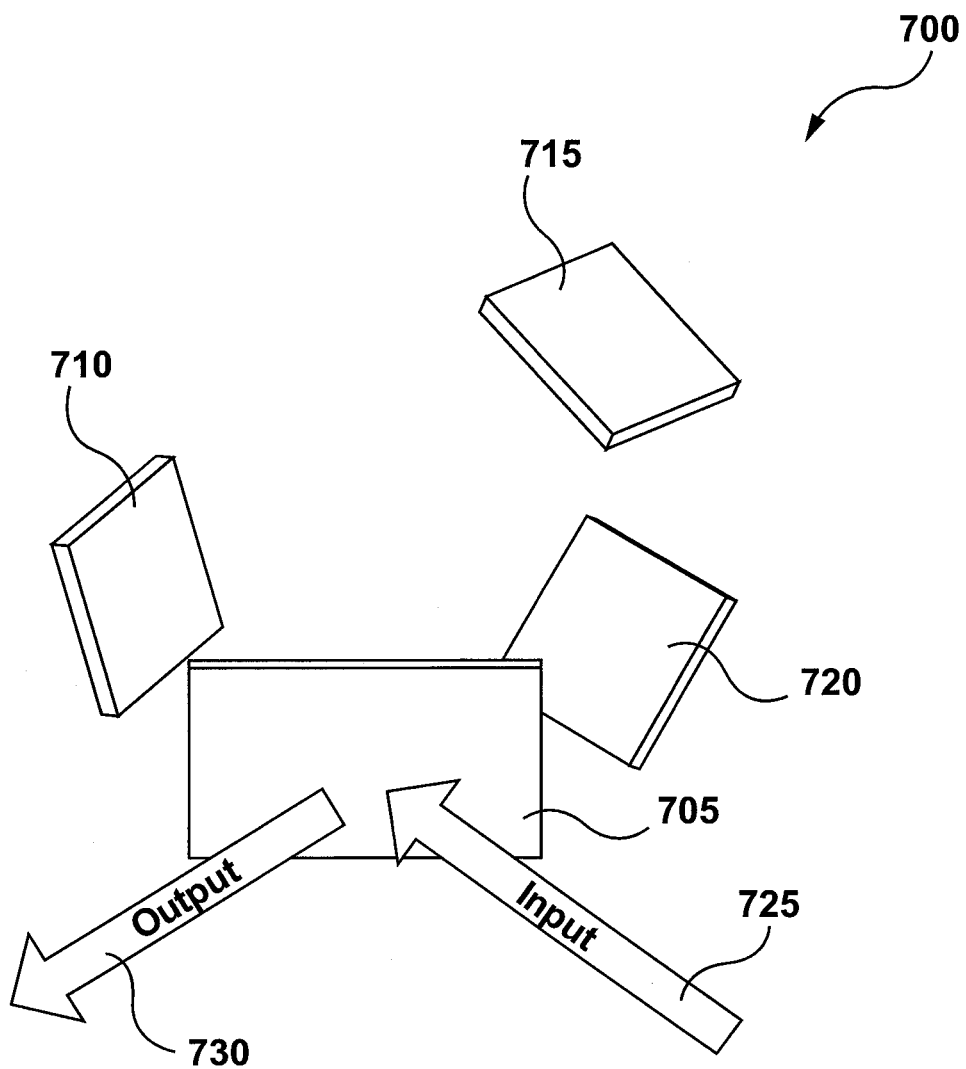
FIG. 7 shows an apparatus for reducing coherence and increasing homogeneity of a laser beam, according to non-limiting implementations.
Figure 8:
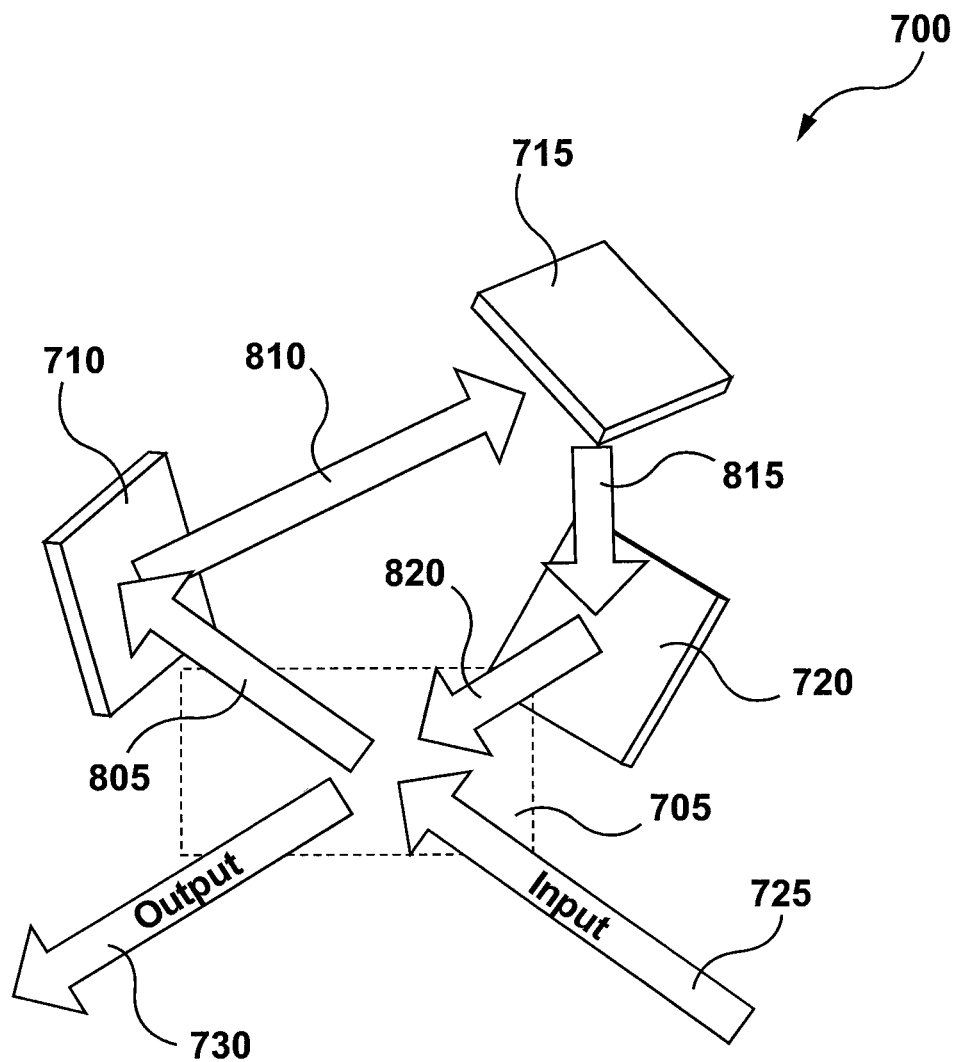
FIG. 8 shows light beams passing through the apparatus of FIG. 7.

FIG. 7 shows an apparatus 700 which can be used for reducing a coherence of a laser beam and/or for homogenizing a laser beam. Apparatus 700 comprises a beam splitter 705, a first reflector 710, a second reflector 715, and a third reflector 720. Beam splitter 705 can have any suitable ratio of reflectivity to transmission, including but not limited to a 50/50 ratio. These four components together define a light path that is a closed loop. FIG. 8 shows the four segments of the light path comprising an input laser beam 805, a first reflected beam 810, a second reflected beam 815, and a third reflected beam 820.

The light path being a closed loop means that once a laser beam enters apparatus 700, it can continue to cycle between beam splitter 705 and reflectors 710, 715, and 720 along the light path, with some of the light being transmitted through beam splitter 705 and out of apparatus 700 during each pass of the beam through the light path loop.

FIGS. 7 and 8 also show a laser beam 725 incident upon beam splitter 705, and an output laser beam 730 propagating from apparatus 700. Referring to FIG. 8, beam splitter 705 transmits a portion of laser beam 725 to form input laser beam 805 directed along the light path towards the first reflector 710. Beam splitter 705 also reflects another portion of laser beam 725 to form a reflected laser beam which forms a part of output laser beam 730 and is directed along the output direction indicated by output laser beam 730.

The first reflector 710, in turn, reflects input laser beam 805 to form the first reflected beam 810 propagating along the light path towards the second reflector 715. The second reflector 715, then, reflects reflected laser beam 810 to form the second reflected beam 815 propagating along the light path towards the third reflector 720. The third reflector 720, in turn, reflects the second reflected beam 815 to form the third reflected beam 820 propagating along the light path towards the beam splitter 705.

Upon receiving the third reflected beam 820, beam splitter 705 transmits a portion of beam 820 to form a part of output laser beam 730 directed in the output direction indicated by the arrow representing output laser beam 730. Beam splitter 705 also transmits another portion of beam 820 to form a further input laser beam propagating along the light path towards reflector 710. This additional input laser beam can be coincident or substantially coincident with input laser beam 805.

Unlike apparatuses 100 and the other apparatuses described thus far, in apparatus 700 the light path defined by beams 805, 810, 815, and 820 does not lie in one plane. In order to produce such a light path, at least two of the four optical components (i.e. beam splitter 705 and reflectors 710, 715, and 720) are tilted in relation to one another about at least two different axes. An example of such axes includes, but is not limited to, the Cartesian axes. In some implementations, one or more of the first reflector 710 and the third reflector 720 are tilted about at least two axes relative to beam splitter 705. This orientation and tilt of the four optical components defining the light path causes the beam to rotate about its axis of propagation by a given rotational displacement every time the beam completes a pass of the light path loop, as will be described in greater detail below.

Figure 9:
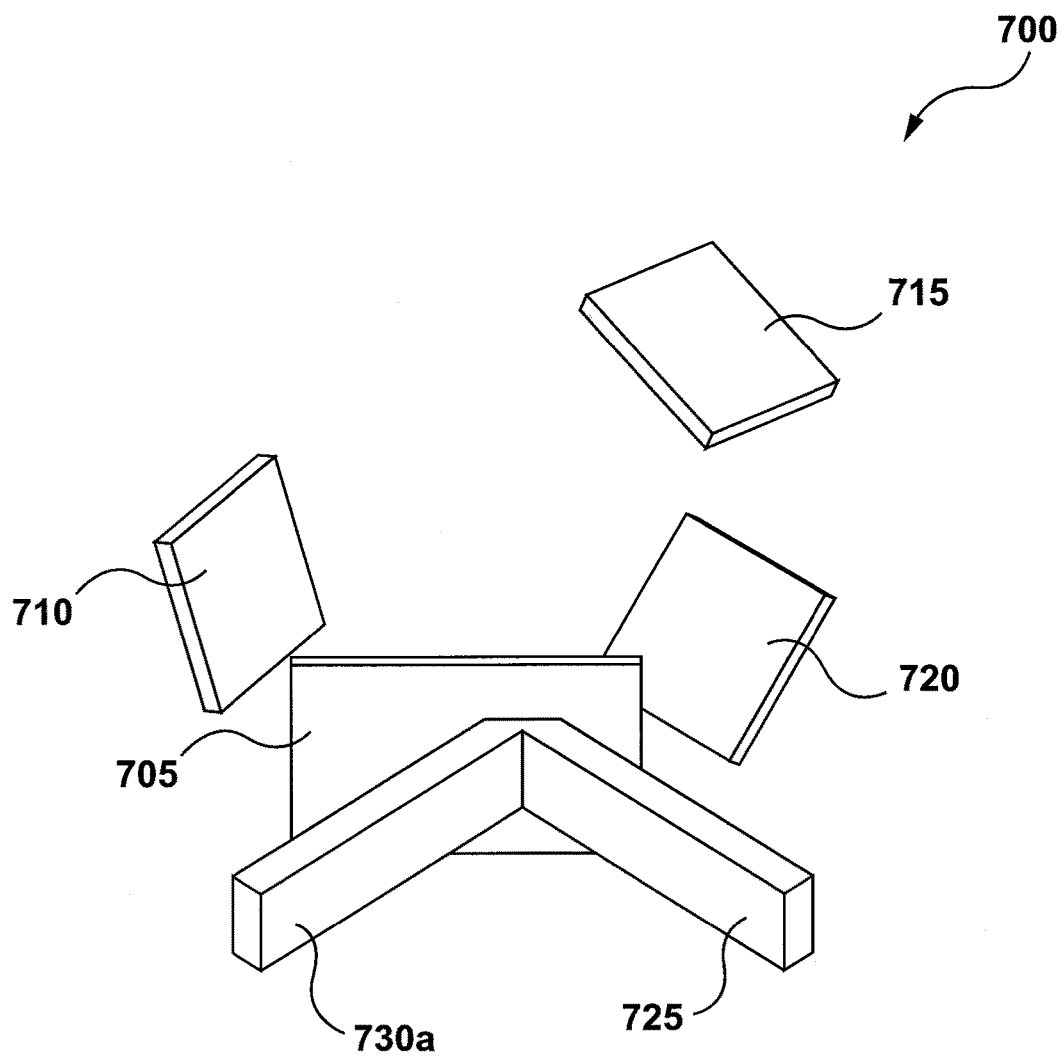
FIG. 9 shows a first output light beam produced by the apparatus of FIG. 7.

FIG. 9 shows apparatus 700, and the four optical components (i.e. beam splitter 705 and reflectors 710, 715, and 720) that define its light path. Laser beam 725 and an output laser beam 730*a* are shown as having a rectangular cross-section to facilitate the visualization of the rotation in the beam induced by apparatus 700. Although FIG. 9 shows the beams as having a rectangular cross-section, it is contemplated that these beams and the other light beams described herein can have any suitable cross-section including, but not limited to, a round or rounded cross-section, an elliptical cross-section, a square cross-section, a polygonal cross-section, and the like. As shown in FIG. 9, one part of output laser beam (denoted as output laser beam 730*a*) is made up of the portion of laser beam 725 that is reflected by beam splitter 705 without entering the light path of apparatus 700. As such, output laser beam 730*a* is not rotated about its axis of propagation relative to the rotational orientation of laser beam 725 about its axis of propagation.

Figure 10:
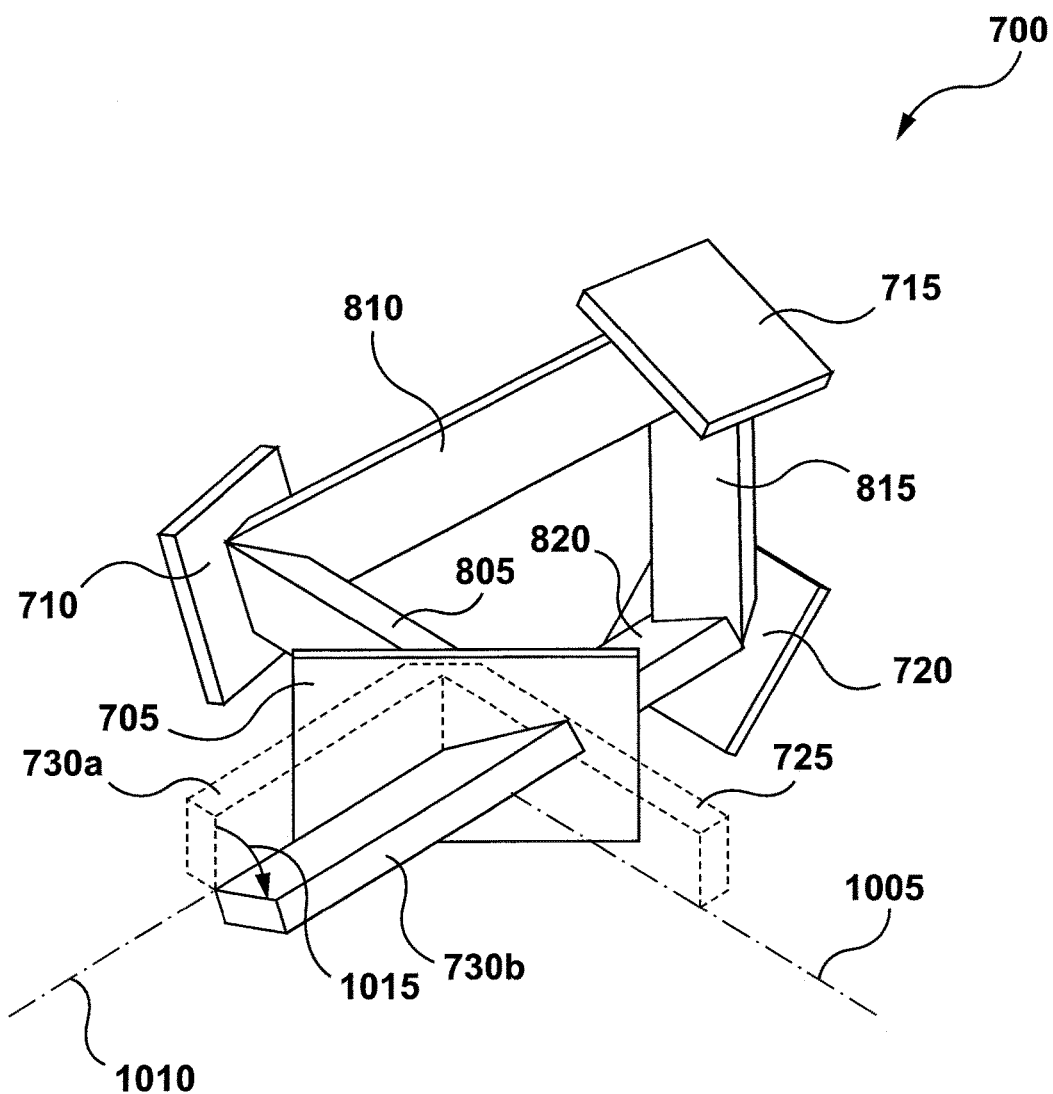
FIG. 10 shows a second output light beam produced by the apparatus of FIG. 7.

FIG. 10 shows the portion of the output laser beam that is generated after the laser beam completes one cycle of the light path defined by apparatus 700. This portion of the output laser beam is shown as output laser beam 730*b*. FIG. 10 shows that output laser beam 730*b* is rotated about its axis of propagation 1010 by a rotational displacement 1015 relative to the rotational orientation of output laser beam 730*a* about axis of propagation 1010. As discussed above, the rotational orientation of output laser beam 730*a* about its axis of propagation 1010 is the same as the rotational orientation of laser beam 725 about its axis of propagation 1005. As such, output laser beam 730*b* is also displaced by rotational displacement 1015 about axis of propagation 1010 relative to rotational orientation of laser beam 725 relative to axis of propagation 1005.

This rotational displacement 1015 is caused by the spatial orientation in relation to one another of the four optical components (i.e. beam splitter 705 and reflectors 710, 715, and 720) that define the light path of apparatus 700. In particular, some of the optical components being titled about two or more axes relative to the other optical components contributes to the generation of rotational displacement 1015.

Figure 11:
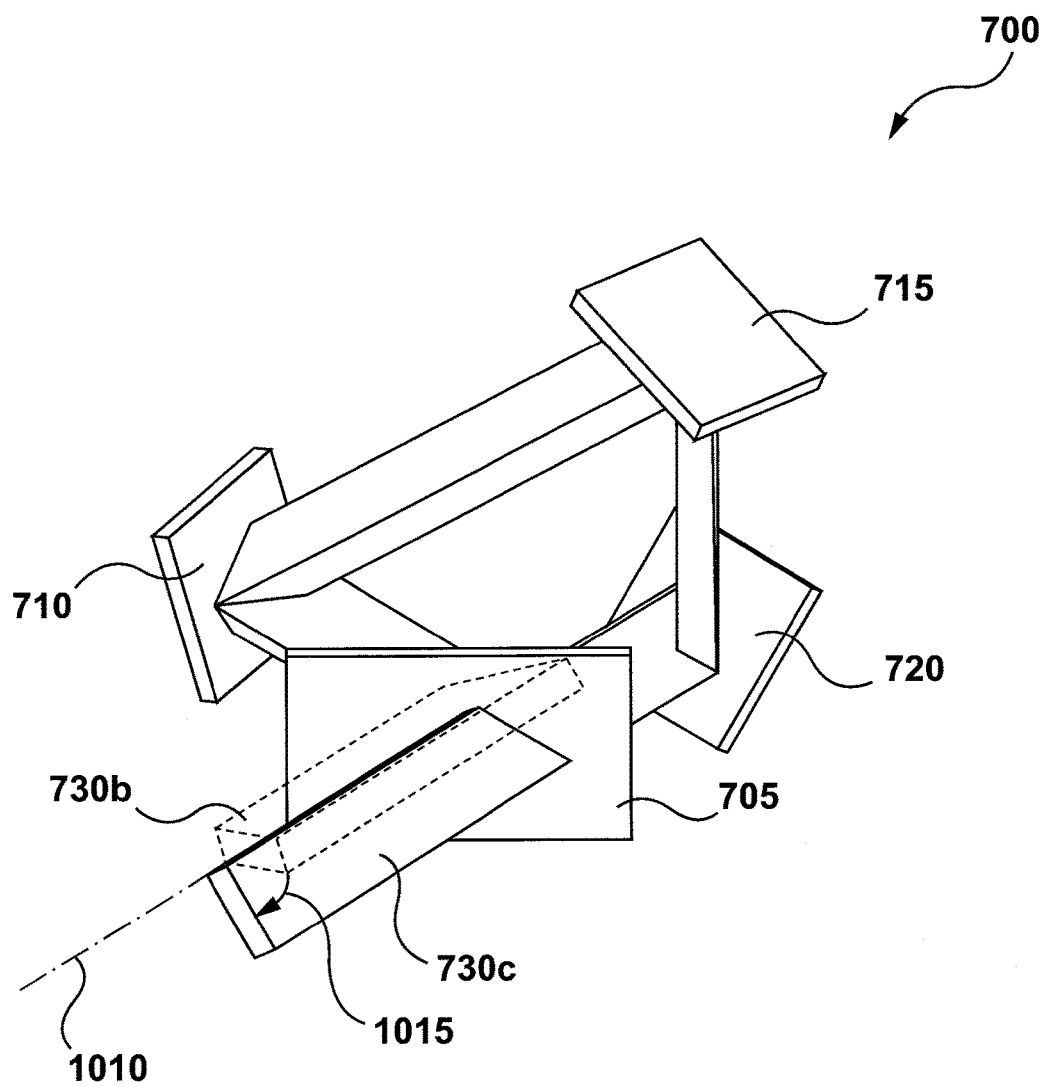
FIG. 11 shows a third output light beam produced by the apparatus of FIG. 7.

FIG. 11 shows apparatus 700 and the laser beam completing a second pass through the light path loop to generate another part of the output laser beam in the form of output laser beam 730*c*. Similar to output laser beam 730*b*, output laser beam 730*c* is also displaced by rotational displacement 1015 about its axis of propagation 1010 relative to the rotational orientation of output laser beam 730b about axis of propagation 1010. In other words, each pass of the beam through the light path of apparatus 700 generates a portion of the output laser beam that is displaced by rotational displacement 1015 about its axis of propagation 1010 relative to the rotational orientation of the portion of the output laser beam generated by the previous pass of the beam through the light path. The size of rotational displacement 1015 is determined by the orientation of the four optical components (i.e. beam splitter 705 and reflectors 710, 715, and 720).

Figure 12:
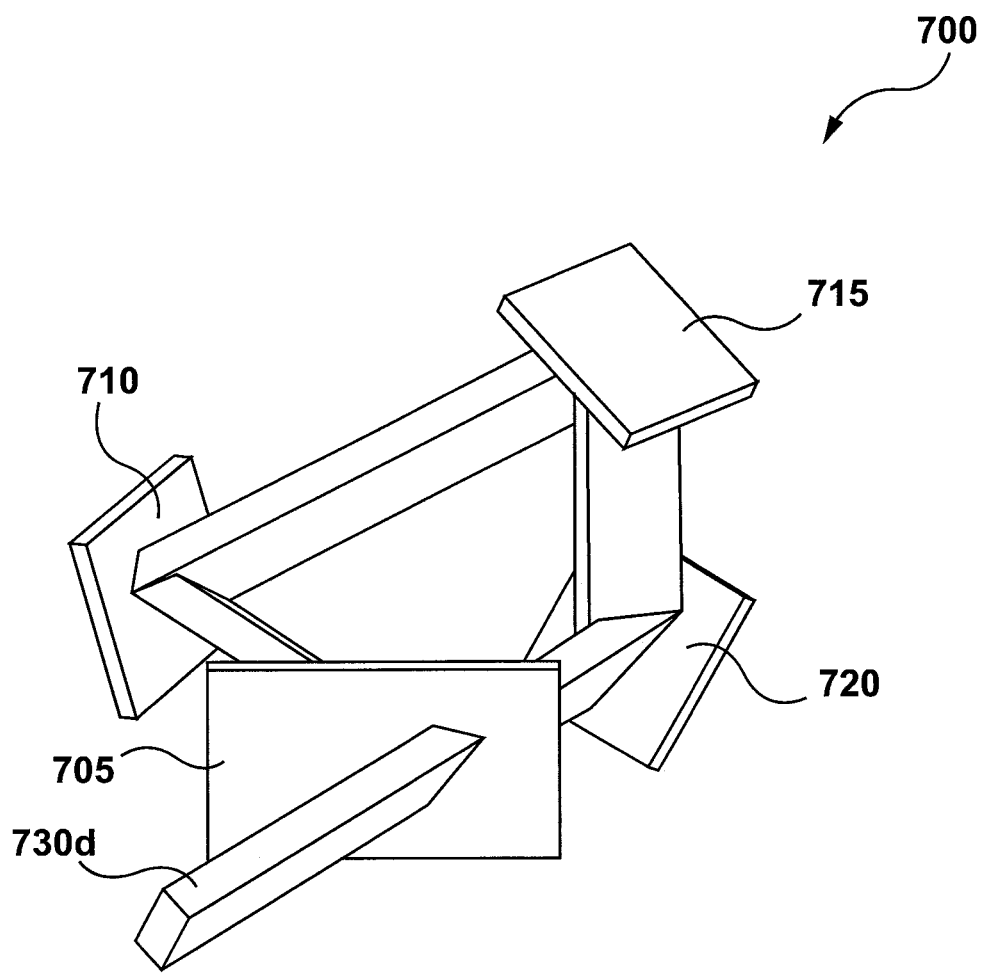
FIG. 12 shows a fourth output light beam produced by the apparatus of FIG. 7.

FIG. 12 shows an output laser beam 730d being a portion of the output laser beam generated by a third pass of the beam through the light path of apparatus 700. While the rotational displacement of output laser beam 730d is not marked in FIG. 12, laser beam 730d is rotated by rotational displacement 1015 (shown in FIG. 11) about its axis of propagation relative to the rotational orientation of output laser beam 730c.

Figure 13:
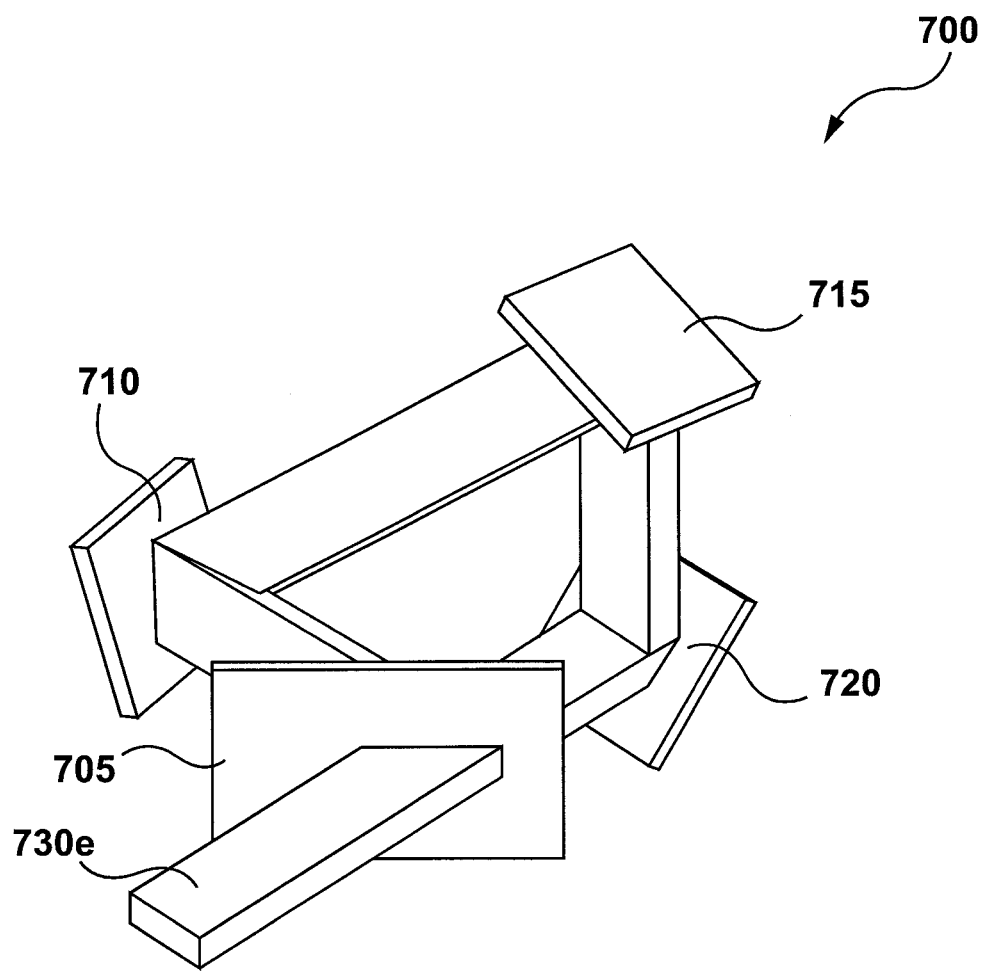
FIG. 13 shows a fifth output light beam produced by the apparatus of FIG. 7.

Similarly, FIG. 13 shows an output laser beam 730e being a portion of the output laser beam generated by a fourth pass of the beam through the light path of apparatus 700. While not marked in FIG. 13, laser beam 730e is rotated by rotational displacement 1015 (shown in FIG. 11) about its axis of propagation relative to the rotational orientation of output laser beam 730d.

While the drawings show only the portions of the output laser beam generated by the first four passes of the beam through the light path of apparatus 700, the skilled person would understand that as the beam continues to cycle through the light path loop, each pass through the loop generates a portion of the output laser beam that is rotated about its axis of propagation by rotational displacement 1015 relative to the rotational orientation of the output laser beam generated by the previous pass of the beam through the light path.

Figure 14:
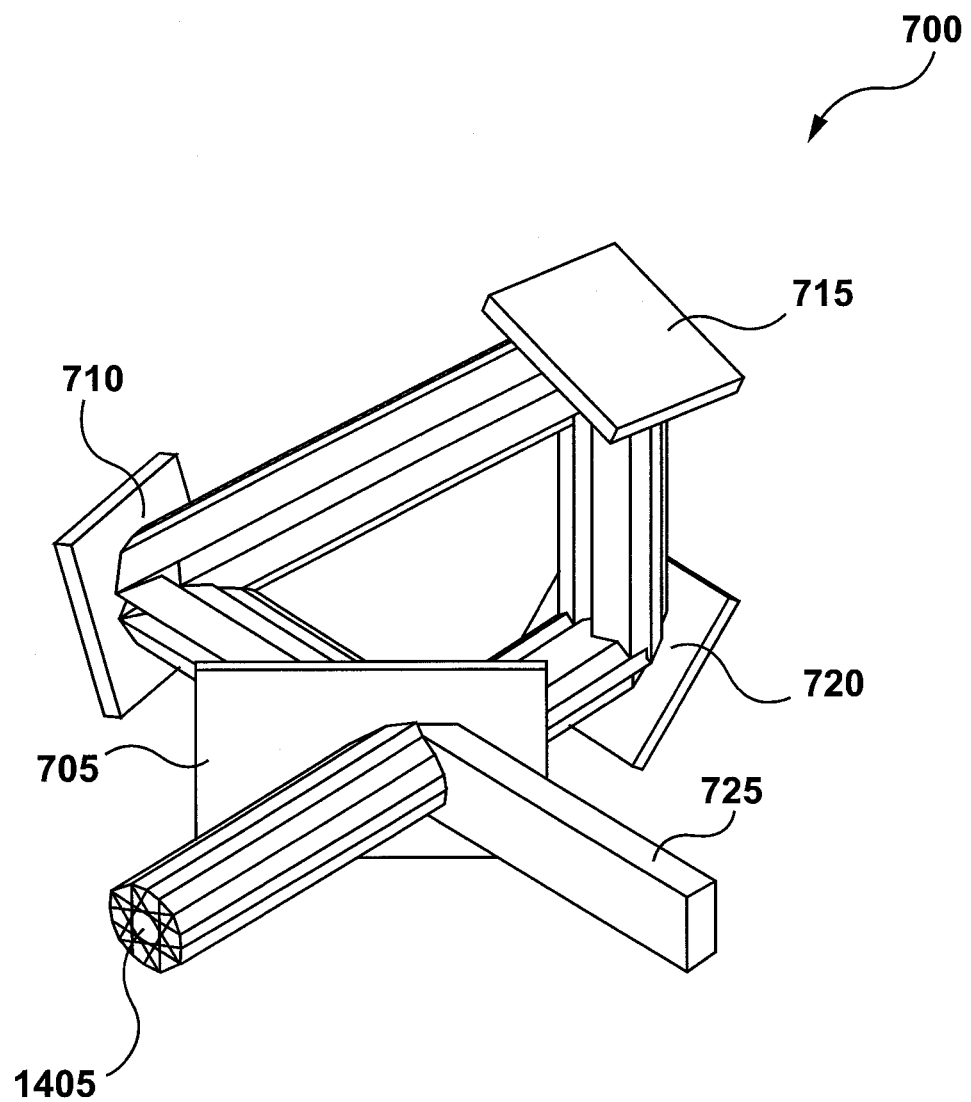
FIG. 14 shows the combination of the of the five output light beams produced by the apparatus of FIG. 7.

FIG. 14 shows laser beam 725 and output laser beams 730a, 730b, 730c, 730d, and 730e combined with each other to make up output laser beam 1405. For a continuous laser beam 725, output laser beam 1405 will be the combination of the output laser beams each with a different rotational orientation/displacement about is axis of propagation based on the number of times the beam generating that output laser beam had cycled through the light path loop. As such, output laser beam 1405 can be more homogenous rotationally than laser beam 725.

If beam splitter 705 and reflectors 710, 715, and 720 are oriented such that rotational displacement 1015 (shown in FIG. 11) cannot be multiplied by a whole number to yield 360° (i.e. if dividing 360° by the rotational displacement produces a non-zero remainder), then the rotational displacement of each output laser beam will be such that the rotational orientation of that output laser beam about its axis of propagation will not be the same as the rotational orientation of any of the output laser beams generated by the previous passes of the beam through the light path. Such a rotational displacement can further enhance the rotational homogeneity of output laser beam 1405 relative to laser beam 725.

Figure 15:
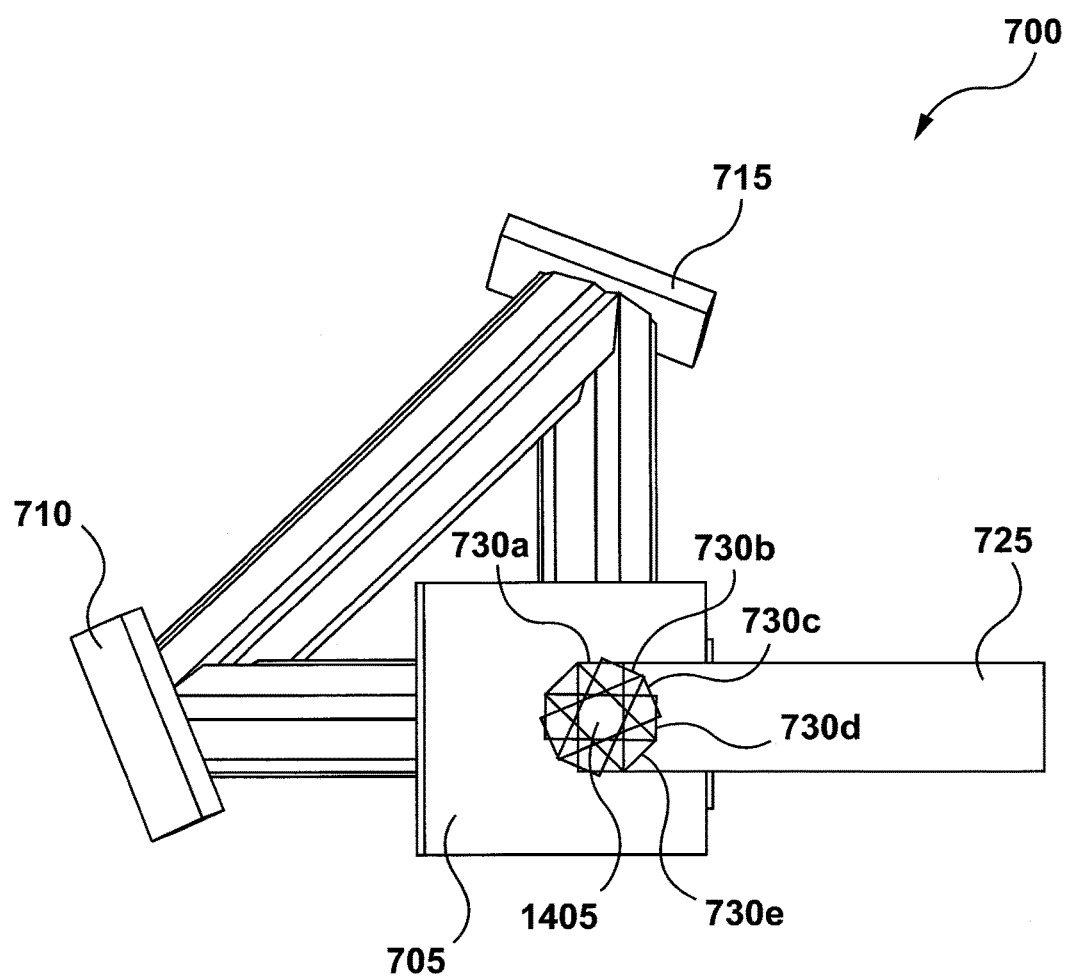
FIG. 15 shows another view the combination of the of the five output light beams shown in FIG. 14.

FIG. 15 shows another view of apparatus 700 and output laser beam 1405 shown in FIG. 13. In FIG. 14 the cross-section of output laser beam 1405 is depicted showing the first five output laser beams (730a, 730b, 730c, 730d, and 730e) that make up output laser beam 1405.

In addition to increasing the rotational homogeneity of the output laser beam, apparatus 700 can also be used to reduce the coherence of laser beam 725. For example, if the length of the light path defined by beam splitter 705 and reflectors 710, 715, and 720 is greater than or equal to the coherence length of laser beam 725, then apparatus 700 can function similar to apparatus 100 to generate additional modes and reduce the coherence of the laser beam. In other words, depending on the length of the light path, apparatus 700 can generate additional modes (thereby reducing coherence) as well as increasing the rotational homogeneity of the laser beam.

To further decrease the coherence and increase the homogeneity of the laser beam, apparatus 700 can be optically coupled (i.e. used in series) with one or more of apparatus 100, apparatus 300, apparatus 400, or any other of the apparatuses described herein. In these combinations, the output laser beam of one apparatus can be used as the laser beam incident upon the other apparatus.

Figure 16:
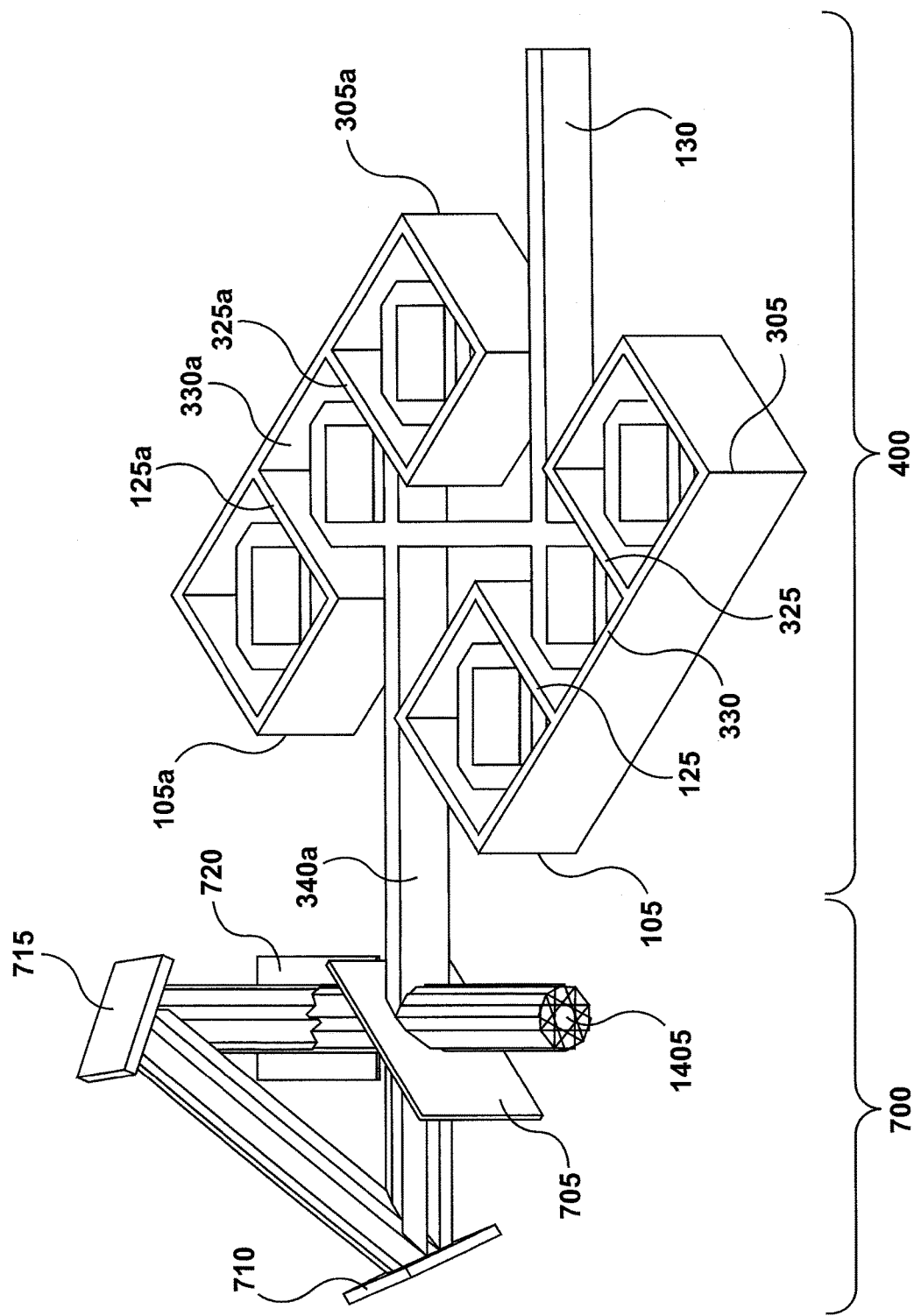
FIG. 16 shows another apparatus for reducing coherence and increasing homogeneity of a laser beam, according to non-limiting implementations.

FIG. 16 shows apparatus 700 optically coupled with apparatus 400 such that output laser beam 340a of apparatus 400 is incident upon and used as an input of apparatus 700. Using apparatus 400 and apparatus 700 together combines the mode generation (and coherence reduction) functionality of apparatus 400 with the rotational homogenization and potential mode generation functionality of apparatus 700 to produce an output laser beam that is less prone to generating speckle and is more rotationally homogenous than would be obtainable if only one of apparatuses 400 and 700 were used.

While in FIG. 16 apparatus 700 is shown as being downstream of apparatus 400 in the optical path, it is also contemplated that apparatus 700 can be upstream of apparatus 400 such that output laser beam 1405 of apparatus 700 can be used as an input for apparatus 400. In some implementations, additional optical elements such as lenses and reflectors can be used to optically couple apparatus 400 and apparatus 700.

In the apparatuses described herein, the reflectors can comprise polished metal, silvered glass or another substrate covered with a layer of reflective metal, or any other suitable reflector. The beam splitters can comprise, but are not limited to, a glass or another transparent substrate covered with dielectric optical coatings or partial metallic coatings. The optical coatings can be configured for interacting with one or more of polarized and non-polarized light. The beam splitter can comprise, but is not limited to, a cube beam splitter, a plate beam splitter, or a pellicle beam splitter.

Moreover, while the above discussion refers to laser beams, the apparatuses discussed herein can be used to reduce the coherence of any other type of coherent light beam. In addition, while some of the drawings show input and output light beams having given input and output directions, the skilled person would understand that the direction of preparation of light through the apparatuses described herein can also be reversed such that the light propagates through each apparatus in a direction opposite to those described above.

The above-described implementations are intended to be exemplary and alterations and modifications may be effected thereto, by those of skill in the art, without departing from the scope of the invention which is defined solely by the claims appended hereto.

We claim:

1. An apparatus for reducing a coherence of a laser beam, the apparatus comprising:
   a chamber being rectangular, the chamber comprising:
      a first wall, a second wall, and a third wall each comprising a reflective inner surface; and
      a fourth wall comprising a beam splitter;

the fourth wall configured to transmit at least a portion of the laser beam into the chamber to form an input laser beam incident upon the first wall;

the first wall configured to reflect the input laser beam onto the second wall;

the second wall configured to reflect the input laser beam onto the third wall;

and the third wall configured to reflect the input laser beam onto the fourth wall;

the fourth wall further configured to reflect a first portion of the input laser beam to form a further input laser beam incident upon the first wall and to transmit a second portion of the input laser beam out of the chamber to form an output laser beam;

the chamber defining a light path extending from the fourth wall, to the first wall, to the second wall, to the third wall, and back onto the fourth wall, the light path being a closed loop, the light path having a length greater than or equal to a coherence length of the laser beam;

a further chamber being rectangular, the further chamber comprising:

a further first wall, a further second wall, and a further third wall each comprising a corresponding reflective inner surface; and a further fourth wall comprising a corresponding beam splitter;

the further chamber defining a further light path extending from the fourth wall, to the first wall, to the second wall, to the third wall, and back onto the fourth wall, the further light path being a closed loop; and a middle wall comprising a corresponding reflective surface, the middle wall disposed between the chamber and the further chamber;

the fourth wall and the further fourth wall facing one another; and the middle wall parallel with the first wall and the further third wall, the middle wall configured to reflect the output laser beam onto an outer surface of the further fourth wall; and whereby the further chamber is configured to receive as an input the output laser beam and produce as an output a further output laser beam.

2. The apparatus of claim 1, wherein the chamber is square.

3. The apparatus of claim 1, wherein the fourth wall comprises a 50/50 beam splitter.

4. The apparatus of claim 1, wherein the further input laser beam is about coincident with the input laser beam.

5. The apparatus of claim 1, further comprising one or more focusing lenses disposed in the light path.

6. The apparatus of claim 1, wherein the middle wall lies on a common plane with the first wall and the further third wall.

7. The apparatus of claim 1, wherein the further chamber is square.

8. The apparatus of claim 1, wherein the length of the light path defined by the chamber is different than a further length of a further light path defined by the further chamber.

9. The apparatus of claim 1, further comprising:

an additional apparatus an additional chamber, an additional further chamber, and an additional middle wall, the additional chamber, the additional further chamber and the additional middle wall respectively similar to the chamber, the further chamber and the middle wall, the additional apparatus oriented in relation to the apparatus such that:

the additional middle wall is disposed about parallel to the middle wall, the corresponding reflective surface of the middle wall facing a corresponding reflective surface of the additional middle wall; and the further chamber is oriented to direct the further output laser beam output from the further chamber to be incident upon an additional fourth wall of the additional chamber as a corresponding input into the additional apparatus;

whereby the additional apparatus is configured to receive as a corresponding input the further output laser beam and produce as a corresponding output an additional output laser beam.

10. The apparatus of claim 9, further comprising:

a secondary apparatus optically coupled with the apparatus to receive the additional output laser beam, the secondary apparatus comprising:

a first reflector, a second reflector, a third reflector, and a secondary beam splitter together defining a secondary light path being a closed loop;

the secondary beam splitter configured to:

transmit an additional first portion of the further output laser beam to form a secondary input laser beam directed along the secondary light path towards the first reflector; and reflect an additional second portion of the further output laser beam to form a reflected laser beam directed in an output direction;

the first reflector configured to reflect the secondary input laser beam along the secondary light path towards the second reflector;

the second reflector configured to reflect the secondary input laser beam reflected from the first reflector along the secondary light path towards the third reflector;

the third reflector configured to reflect the secondary input laser beam reflected from the second reflector along the secondary light path and in the output direction towards the secondary beam splitter;

one or more of the first reflector and the third reflector tilted about at least two axes relative to the secondary beam splitter;

the secondary beam splitter further configured to:

transmit a third portion of the secondary input laser beam reflected from the third reflector to form a secondary output laser beam directed in the output direction; and reflect a fourth portion of the secondary input laser beam reflected from the third reflector along the secondary light path towards the first reflector; and the secondary output laser beam having a rotational orientation about its axis of propagation that is displaced by a rotational displacement relative to a corresponding rotational orientation of the additional output laser beam about its corresponding axis of propagation.

11. The apparatus of claim 9, further comprising a secondary apparatus comprising:

a first reflector, a second reflector, a third reflector, and a secondary beam splitter together defining a secondary light path being a closed loop;

the secondary beam splitter configured to:

transmit an additional first portion of the further output laser beam to form a secondary input laser beam directed along the secondary light path towards the first reflector; and reflect an additional second portion of the further output laser beam to form a reflected laser beam directed in an output direction;

the first reflector configured to reflect the secondary input laser beam along the secondary light path towards the second reflector;

the second reflector configured to reflect the secondary input laser beam reflected from the first reflector along the secondary light path towards the third reflector;

the third reflector configured to reflect the secondary input laser beam reflected from the second reflector along the secondary light path and in the output direction towards the secondary beam splitter;

one or more of the first reflector and the third reflector tilted about at least two axes relative to the secondary beam splitter;

the secondary beam splitter further configured to:
transmit a third portion of the secondary input laser beam reflected from the third reflector to form a secondary output laser beam directed in the output direction; and reflect a fourth portion of the secondary input laser beam reflected from the third reflector along the secondary light path towards the first reflector; and the secondary output laser beam having a rotational orientation about its axis of propagation that is displaced by a rotational displacement relative to a corresponding rotational orientation of the additional output laser beam about its corresponding axis of propagation wherein the apparatus and the secondary apparatus are optically coupled such that the secondary output laser beam of the secondary apparatus is usable as the laser beam of the apparatus.

12. The apparatus of claim 1, further comprising:
an additional apparatus optically coupled with the apparatus to receive the further output laser beam, the additional apparatus comprising:
a first reflector, a second reflector, a third reflector, and an additional beam splitter together defining an additional light path being a closed loop;
the additional beam splitter configured to:
transmit an additional first portion of the further output laser beam to form an additional input laser beam directed along the additional light path towards the first reflector; and reflect an additional second portion of the further output laser beam to form a reflected laser beam directed in an output direction;

the first reflector configured to reflect the additional input laser beam along the additional light path towards the second reflector;

the second reflector configured to reflect the additional input laser beam reflected from the first reflector along the additional light path towards the third reflector;

the third reflector configured to reflect the additional input laser beam reflected from the second reflector along the additional light path and in the output direction towards the additional beam splitter;

one or more of the first reflector and the third reflector tilted about at least two axes relative to the additional beam splitter;

the additional beam splitter further configured to:
transmit a third portion of the additional input laser beam reflected from the third reflector to form an additional output laser beam directed in the output direction; and reflect a fourth portion of the additional input laser beam reflected from the third reflector along the additional light path towards the first reflector; and the additional output laser beam having a rotational orientation about its axis of propagation that is displaced by a rotational displacement relative to a corresponding rotational orientation of the further output laser beam about its corresponding axis of propagation.

13. The apparatus of claim 1, further comprising:
an additional apparatus comprising:
a first reflector, a second reflector, a third reflector, and an additional beam splitter together defining an additional light path being a closed loop;
the additional beam splitter configured to:
transmit an additional first portion of an additional laser beam to form an additional input laser beam directed along the additional light path towards the first reflector; and reflect an additional second portion of the further output laser beam to form a reflected laser beam directed in an output direction;

the first reflector configured to reflect the additional input laser beam along the additional light path towards the second reflector;

the second reflector configured to reflect the additional input laser beam reflected from the first reflector along the additional light path towards the third reflector;

the third reflector configured to reflect the additional input laser beam reflected from the second reflector along the additional light path and in the output direction towards the additional beam splitter;

one or more of the first reflector and the third reflector tilted about at least two axes relative to the additional beam splitter;

the additional beam splitter further configured to:
transmit a third portion of the additional input laser beam reflected from the third reflector to form an additional output laser beam directed in the output direction; and reflect a fourth portion of the additional input laser beam reflected from the third reflector along the additional light path towards the first reflector; and the additional output laser beam having a rotational orientation about its axis of propagation that is displaced by a rotational displacement relative to a corresponding rotational orientation of the additional laser beam about its corresponding axis of propagation; and wherein the apparatus and the additional apparatus are optically coupled such that the additional output laser beam of the additional apparatus is usable as the laser beam of the apparatus.

* * * * *